United States Patent
Jogo et al.

(10) Patent No.: US 8,766,945 B2
(45) Date of Patent: Jul. 1, 2014

(54) INPUT DEVICE AND METHOD FOR TOUCH POSITION CALCULATION

(71) Applicant: Fujitsu Limited, Kawasaki (JP)

(72) Inventors: Arata Jogo, Kawasaki (JP); Makoto Saotome, Kawasaki (JP); Susumu Kashiwagi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/706,659

(22) Filed: Dec. 6, 2012

(65) Prior Publication Data

US 2013/0176247 A1  Jul. 11, 2013

(30) Foreign Application Priority Data

Jan. 6, 2012 (JP) ................................. 2012-001606

(51) Int. Cl.
    *G06F 3/041* (2006.01)
(52) U.S. Cl.
    USPC .......................................................... 345/173
(58) Field of Classification Search
    USPC ..................... 345/173–178; 178/18.01–18.11
    See application file for complete search history.

(56) References Cited

U.S. PATENT DOCUMENTS

| | | | |
|---|---|---|---|
| 2010/0289754 A1* | 11/2010 | Sleeman et al. | 345/173 |
| 2012/0007821 A1* | 1/2012 | Zaliva | 345/173 |
| 2012/0032891 A1* | 2/2012 | Parivar | 345/173 |
| 2013/0009896 A1* | 1/2013 | Zaliva | 345/173 |

FOREIGN PATENT DOCUMENTS

| | | |
|---|---|---|
| JP | 2010-061372 A | 3/2010 |
| JP | 2010-204812 A | 9/2010 |

* cited by examiner

*Primary Examiner* — Kent Chang
*Assistant Examiner* — Nathan Brittingham
(74) *Attorney, Agent, or Firm* — Maschoff Brennan

(57) ABSTRACT

An input device includes an acquisition unit to acquire touch region information including position coordinates of a plurality of sensors in a touch screen and a sensed value of each sensor, a first calculation unit to calculate a shape of a touch region based on the touch region information, and a second calculation unit to calculate a detected touch position detected as a touch position based on the shape.

6 Claims, 17 Drawing Sheets

FIG. 9

| PARTITIONED REGION | FACTOR α |
|---|---|
| A1 | α1 |
| A2 | α2 |
| A3 | α3 |

FIG. 13

| PARTITIONED REGION | FACTOR α |
|---|---|
| AR1 | α1 |
| AR2 | α2 |
| AR3 | α3 |
| AL1 | α4 |
| AL2 | α5 |
| AL3 | α6 |

FIG. 14

| PARTITIONED REGION | FACTOR α |
|---|---|
| AR1 | α4 |
| AR2 | α5 |
| AR3 | α6 |
| AL1 | α1 |
| AL2 | α2 |
| AL3 | α3 |

INPUT DEVICE AND METHOD FOR TOUCH POSITION CALCULATION

CROSS-REFERENCE TO RELATED APPLICATION

This application is based upon and claims the benefit of priority of the prior Japanese Patent Application No. 2012-001606, filed on Jan. 6, 2012, the entire contents of which are incorporated herein by reference.

FIELD

The embodiments discussed herein are related to an input device and a method for touch position calculation.

BACKGROUND

In recent years, there have been increasing electronics, such as a mobile terminal, having a touch screen mounted thereon. Buttons are used for an input to a typical mobile terminal in the past, and many of the users of such mobile terminal input with one hand even using the thumb. Therefore, when using a mobile terminal having a touch screen mounted thereon as well, it is a mainstream to hold the mobile terminal with one hand and to input using the thumb. When inputting using one of the thumbs in such a manner, in a case that a position of the mobile terminal held by a user (the base portion of the thumb or the like) is far from a target touch position (an input target position), a ball of the thumb sometimes gets in a state of making contact with a portion other than the target touch position. Then, this sometimes causes a position detected as a touch position (that is, a detected touch position) to be different from the target touch position.

For example, there are, in conventional technologies, input devices that solve such a gap between the target touch position and the detected touch position. The input device calculates a correction amount D/N based on a width D of a contact region and a predefined correction parameter N, and assumes coordinates obtained by adding the correction amount D/N to the center coordinates of the contact region as an operating point. In other words, the detected touch position is corrected based on the size of the contact region.

Since the size of a user's finger varies, the size of the contact region varies depending on the user even in a situation of the same holding position and input target position. The size of the contact region also varies depending on a pressing force. In other words, even in a case that the contact angle of a finger with a touch screen is same, the area of the contact region becomes larger as the pressing force becomes greater.

Accordingly, in a case that the detected touch position is uniformly corrected based only on the size of the contact region, there is a problem that it is difficult to carry out accurate correction when the size of the user's finger is different from an assumed size.

In a case of inputting with a finger of a hand different from the hand holding the mobile terminal, the finger can be made contact with a screen surface of the touch screen from a normal direction of the touch screen, so that it is preferred to fix a correction value even in a case of a different user or even in a case of a different pressing force. However, in a case of uniformly correcting a detected touch position based only on the size of the contact region, the correction value turns out to vary depending on a difference in the user or a difference in the pressing force, and thus there is a problem that it is difficult to carry out accurate correction.

Japanese Laid-open Patent Publication Nos. 2010-204812 and 2010-61372 are examples of related art.

SUMMARY

According to an aspect of the invention, an input device includes an acquisition unit to acquire touch region information including position coordinates of a plurality of sensors in a touch screen and a sensed value of each sensor, a first calculation unit to calculate a shape of a touch region based on the touch region information, and a second calculation unit to calculate a detected touch position detected as a touch position based on the shape.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a chart for a description of a correspondence table;

FIG. 13 is a chart for a description of a correspondence table for a right hand;

FIG. 14 is a chart for a description of a correspondence table for a left hand;

DESCRIPTION OF EMBODIMENTS

Figure 1:
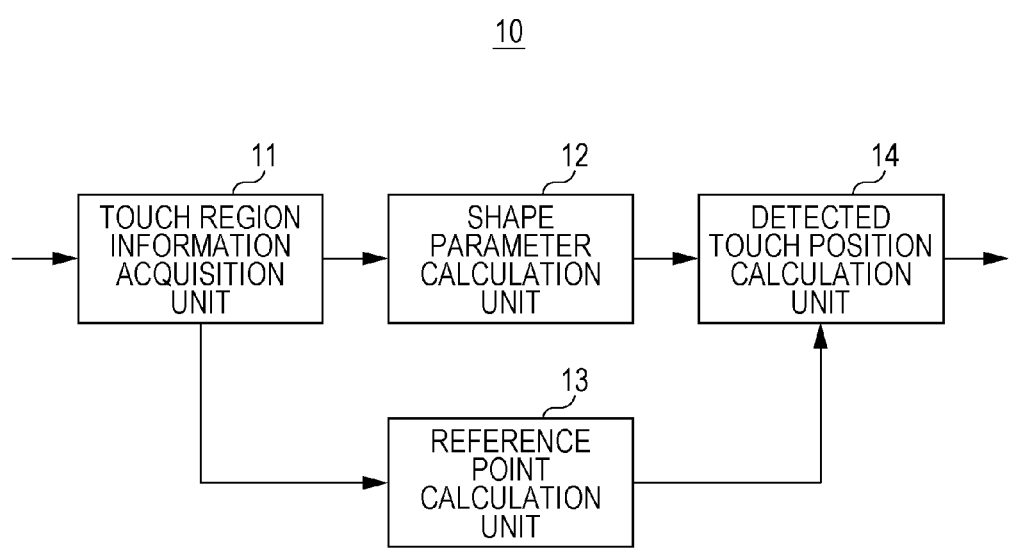
FIG. 1 is a block diagram illustrating a configuration example of an input device according to a first embodiment.

A detailed description is given below to embodiments of an input device and a touch position calculation method disclosed herein based on the drawings. These embodiments do not limit the input device and the touch position calculation method disclosed herein. In the embodiments, an identical reference character is assigned to components having an identical function to omit repetitive descriptions.

First Embodiment

Configuration of Input Device 10

FIG. 1 is a block diagram illustrating a configuration example of an input device 10 according to a first embodiment. The input device 10 is connected to a touch screen, not illustrated, and receives information on "a touch region" (hereinafter, called as "touch region information") from the touch screen. The system of the touch screen is not particularly limited and includes a capacitive system, a resistive film system, an optical system, and the like. In any system, a sensor group is arranged in a grid, for example, in the touch screen. Here, the touch region is a contact region of the touch screen with a user. The touch region information is information on a touch position group included in the touch region. The touch region information includes a plurality of sensor data items, and each of the sensor data items includes position coordinates of each sensor and a sensed value detected by each sensor. The sensed value is, for example, a capacitance value detected by the sensor in a case of a touch screen of a capacitive system.

In FIG. 1, the input device 10 has a touch region information acquisition unit 11, a shape parameter calculation unit 12, a reference point calculation unit 13, and a detected touch position calculation unit 14.

The touch region information acquisition unit 11 acquires the touch region information and outputs to the shape parameter calculation unit 12 and the reference point calculation unit 13.

The shape parameter calculation unit 12 calculates a shape parameter based on the touch region information received from the touch region information acquisition unit 11.

Specifically, the shape parameter calculation unit 12 firstly calculates a separation distance d between sensors, among a sensor data group included in the touch region information and also having sensed values not less than a predefined value, corresponding to each of the two sensor data items. The shape parameter calculation unit 12 then specifies a sensor pair at the longest separation distance based on the calculation result. In other words, the shape parameter calculation unit 12 calculates, among a line segment group joining two points respectively on the periphery of the touch region, the longest line segment (hereinafter, may be called as a longer axis or a first line segment) and a length thereof.

The shape parameter calculation unit 12 next calculates a second line segment having "predefined relative positional relationship" with the first line segment (hereinafter, may be called as a shorter axis). The predefined relative positional relationship includes a predefined position of an intersection point of the first and second line segments in the first line segment (hereinafter, called as "an intersection point position") and a predefined angle made by the first and second line segments (hereinafter, called as "a crossing angle"). In other words, the shape parameter calculation unit 12 specifies the second line segment that has end points of two intersection points of a straight line in predefined relative positional relationship with the first line segment and an outline of the touch region and calculates a length d' thereof. Here, it is preferred that the intersection point position is positioned in a central portion excluding both end portions of the first line segment, and is a midpoint of the first line segment, for example. The crossing angle is, for example, 90 degrees.

The shape parameter calculation unit 12 next calculates a ratio d/d' of the length of the first line segment to the length of the second line segment as an axial ratio.

The axial ratio thus calculated and the coordinates of the end points of the first line segment (that is, position coordinates of the specified sensor pair) are outputted as a shape parameter to the detected touch position calculation unit 14.

The reference point calculation unit 13 calculates a reference point, which is a position before correction in the detected touch position calculation unit 14, based on the touch region information received from the touch region information acquisition unit 11. Specifically, the reference point calculation unit 13 calculates the reference point based on the distribution of capacitance in the touch region indicated by the touch region information. As the reference point, the reference point may also be a sensor position of the largest capacitance value. Alternatively, the reference point may also be a location with the largest capacitance based on the sensor position of the largest capacitance value and the distribution of capacitance in the vicinity of the position. This enables to derive coordinates of the reference point at a resolution finer than the sensor width.

The detected touch position calculation unit 14 calculates the detected touch position based on the shape parameter and the reference point.

Specifically, the detected touch position calculation unit 14 calculates a correction vector based on the shape parameter. The detected touch position calculation unit 14 then corrects the reference point using the correction vector.

Figure 2:
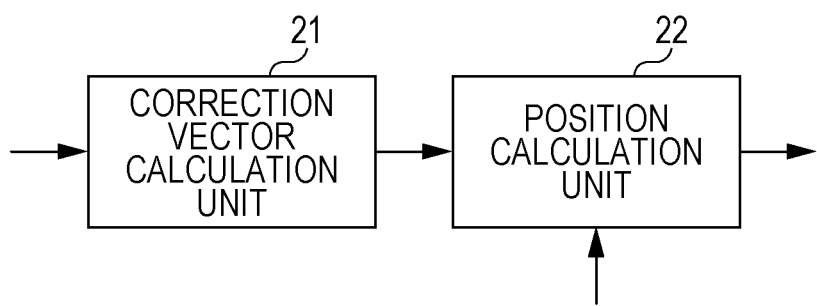
FIG. 2 is a block diagram illustrating a configuration example of a detected touch position calculation unit in the first embodiment.

FIG. 2 is a block diagram illustrating a configuration example of a detected touch position calculation unit 14. In FIG. 2, the detected touch position calculation unit 14 has a correction vector calculation unit 21 and a position calculation unit 22.

The correction vector calculation unit 21 calculates the length of the correction vector based on the axial ratio. The correction vector calculation unit 21 also calculates an angle θ, based on the coordinates of the two end points of the first line segment and information on a first reference vector, which is one of two reference vectors defining a touch screen surface, made by the first line segment and the first reference vector. This angle θ corresponds to the direction of the correction vector. Here, the first reference vector is, for example, an X axis vector defining the X axis in a case of the touch screen surface being an X-Y plane.

The position calculation unit 22 calculates coordinates in which the correction vector is added to the coordinates of the reference point as the detected touch position.

[Behavior of Input Device 10]

Figure 3:
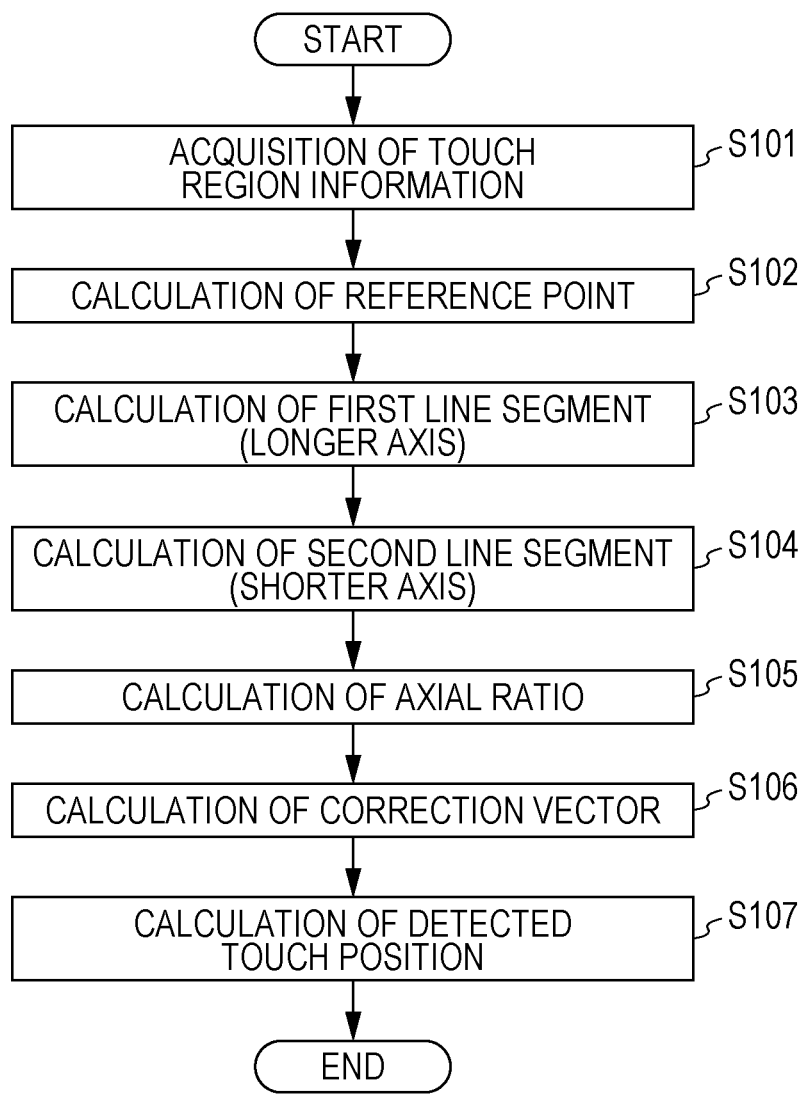
FIG. 3 is a method for a description of a behavior of the input device according to the first embodiment.
Figure 4:
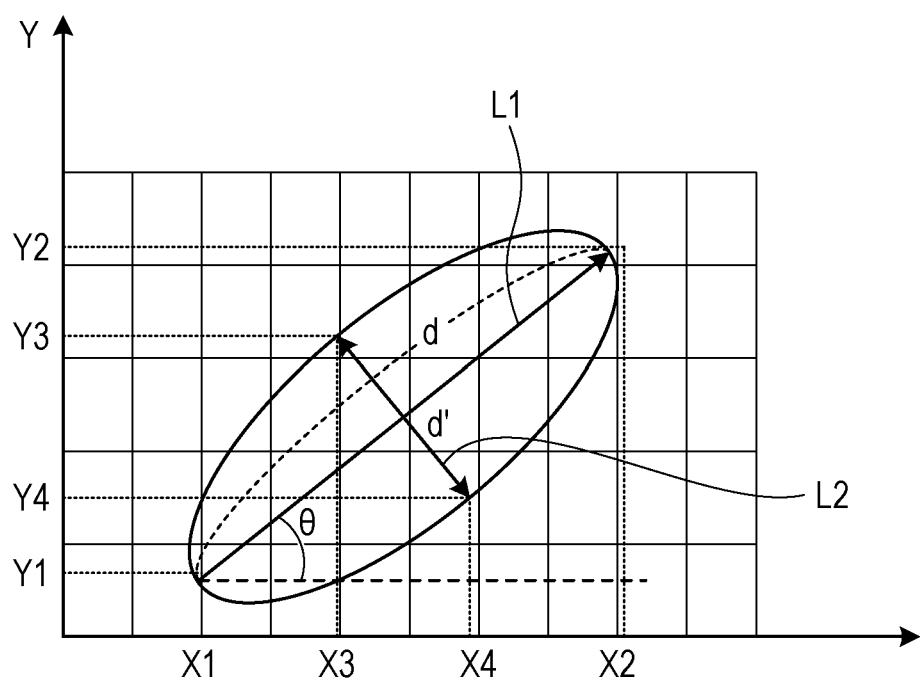
FIG. 4 is a chart for a description of process in a shape parameter calculation unit and a detected touch position calculation unit in the first embodiment.
Figure 5:
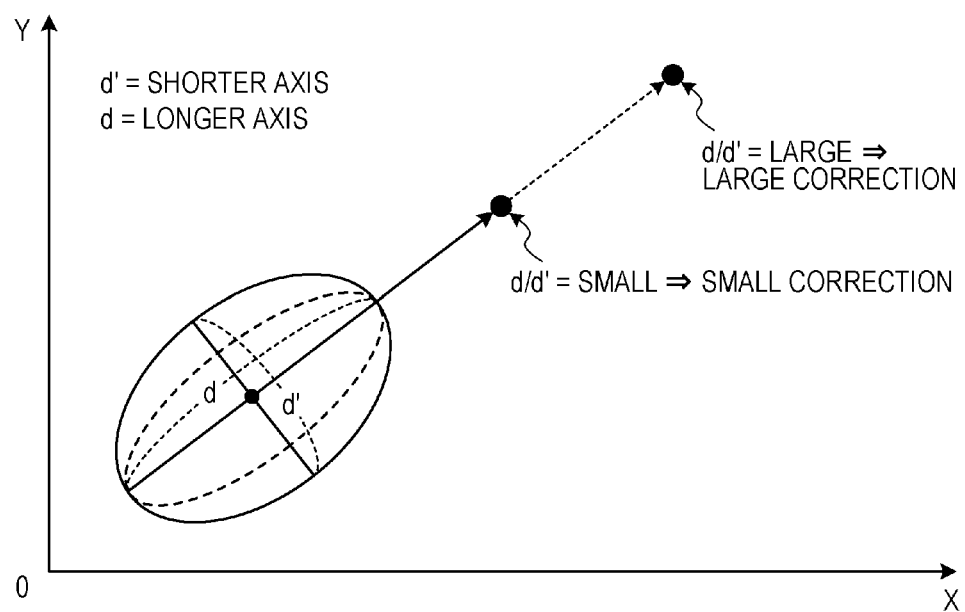
FIG. 5 is a chart for a description of process in the detected touch position calculation unit in the first embodiment.

A description is given to a behavior of the input device 10 having the above configuration. FIG. 3 is a method for a description of a behavior of the input device 10. FIG. 4 is a chart for a description of process in a shape parameter calculation unit 12 and a detected touch position calculation unit 14. FIG. 5 is a chart for a description of process in the detected touch position calculation unit 14.

In step S101, the touch region information acquisition unit 11 acquires the touch region information.

In step S102, the reference point calculation unit 13 calculates the reference point based on the touch region information received from the touch region information acquisition unit 11.

In step S103, the shape parameter calculation unit 12 calculates the separation distance d between sensors, among the sensor data group included in the touch region information and also having sensed values not less than a predefined value, corresponding to each of the two sensor data items. The shape parameter calculation unit 12 then specifies the sensor pair at the longest separation distance based on the calculation result. In other words, the shape parameter calculation unit 12 calculates the first line segment.

In step S104, the shape parameter calculation unit 12 calculates the second line segment having predefined relative positional relationship with the first line segment.

In FIG. 4, the X-Y plane corresponds to the touch screen surface, and each grid point illustrated on the X-Y plane corresponds to each sensor coordinates. Then, a region illustrated by an ellipse in FIG. 4 is the touch region. In such a situation, in step S103, a line segment L1 is calculated as the first line segment. In other words, (X2, Y2) and (X1, Y1) are specified as the two end points of the first line segment. At this time, a length d of the first line segment is obtained by calculating $\{(X2-X1)^2+(Y2-Y1)^2\}^{1/2}$.

When the intersection point position of the predefined relative positional relationship is the midpoint of the first line segment and the crossing angle is 90 degrees, a line segment L2 is calculated as the second line segment as illustrated in FIG. 4. In other words, (X3, Y3) and (X4, Y4) are specified as both end points of the second line segment. At this time, the length d' of the second line segment is obtained by calculating $\{(X4-X3)^2+(Y4-Y3)^2\}^{1/2}$.

Back to FIG. 3, in step S105, the shape parameter calculation unit 12 calculates the ratio d/d' of the length of the first line segment to the length of the second line segment as an axial ratio.

In step S106, the detected touch position calculation unit 14 calculates the correction vector based on the shape parameter. For example, the detected touch position calculation unit 14 considers the length of the correction vector as the axial ratio itself. The angle θ indicating the direction of the correction vector can be obtained, for example, by the following equation (1).

$$\tan \theta = (Y2-Y1)/(X2-X1) \quad (1)$$

In step S107, the detected touch position calculation unit 14 corrects the reference point using the correction vector. In other words, the detected touch position calculation unit 14 calculates the detected touch position based on the reference point and the correction vector.

Specifically, the detected touch position calculation unit 14 calculates the detected touch position by the following equation (2).

$$(X',Y')=(Xg+d/d'\times\cos\theta, Yg+d/d'\times\sin\theta) \quad (2)$$

In the equation (2), (Xg, Yg) are coordinates of the reference point, and (X', Y') are coordinates of the detected touch position.

In other words, in a case that d/d' is small (that is, a case that the shape of the touch region is close to a circle) as illustrated in FIG. 5, the length of the correction vector (that is, correction value) becomes small. In contrast, in a case that d/d' is large (that is, a case that the shape of the touch region is an ellipse), the length of the correction vector (that is, correction value) becomes large.

Here, in a case of inputting with a finger of a hand different from the hand holding the mobile terminal, the target touch position can be pressed accurately on a fingertip, so that the correction value may be small. Since the shape of the touch region at this time becomes closer to a circle, d/d' becomes small and the correction value also becomes small.

In contrast, in a case that the position of the mobile terminal held by a use is far from the target touch position, it turns out to press a location different from the target touch position with a finger ball, so that it is preferred that the correction value is large. Since the touch region at this time becomes an ellipse, d/d' becomes large and the correction value also becomes large.

Still here, in a case of inputting with a finger of a hand different from the hand holding the mobile terminal, the finger can be made contact with the touch screen from the normal direction of the touch screen, so that the shape of the touch region becomes closer to a circle independent of the user or the pressing force. The axial ratio at this time becomes a value close to 1. Accordingly, in such a case, the correction value can be approximately fixed.

In a case that the position of the mobile terminal held by the user is far from the target touch position, the shape of the touch region becomes an ellipse. The axial ratio of this ellipse is less user dependent compared with a single axis. Accordingly, even when a user is different, the correction value can be approximately fixed.

In other words, using the axial ratio of the touch region for the correction value, the accuracy of the detected touch position can be improved with a simple configuration.

While the length of the correction vector is defined as the axial ratio itself here, it is not limited to this and may also be a value obtained by multiplying the axial ratio by a predefined factor α. In other words, the extent of correction may also be adjusted using the factor α. In this case, the detected touch position is calculated by the following equation (3).

$$(X',Y')=(Xg+d/d'\times\alpha\times\cos\theta, Yg+d/d'\times\alpha\times\sin\theta) \quad (3)$$

As just described above, according to the present embodiment, in the input device 10, the shape parameter calculation unit 12 calculates the shape of the touch region based on the touch region information and the detected touch position calculation unit 14 calculates the detected touch position based on the calculated shape.

This enables to calculate the detected touch position based on not the size but the shape of the touch region. As a result, the influence of a user or a pressing force can be decreased as much as possible, so that the gap between the detected touch position and the target touch position can be reduced and thus the touch screen can be improved in the ease of use.

Specifically, the shape parameter calculation unit 12 memorizes the predefined relative positional relationship of a line segment and a straight line crossing the line segment. The shape parameter calculation unit 12 then calculates the first line segment that has end points of the position coordinates of two sensors having the largest separation distance among the plurality of sensors and the second line segment that has end points of two intersection points of the touch region and the straight line having the predefined relative positional relationship with the first line segment. The detected touch position calculation unit 14 then calculates the detected touch position based on the axial ratio, which is a ratio of the length of the first line segment to the length of the second line segment, the angle θ made by the first line segment and the reference vector on the screen surface of the touch screen, and the reference point of the touch region.

Second Embodiment

In a second embodiment, the screen surface of the touch screen is partitioned into a plurality of partitioned regions, and the factor α is defined as a factor value corresponding to the partitioned region to which the touch region belongs.

[Configuration of Input Device 30]

Figure 6:
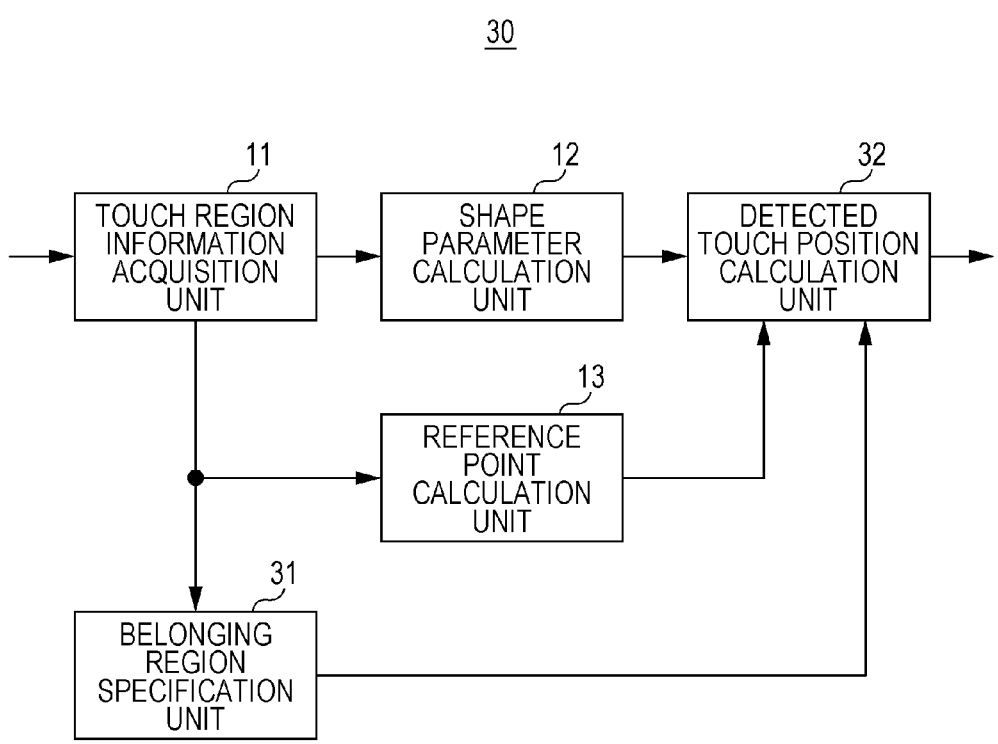
FIG. 6 is a block diagram illustrating a configuration example of an input device according to a second embodiment.

FIG. 6 is a block diagram illustrating a configuration example of an input device 30 according to the second embodiment. In FIG. 6, the input device 30 has a belonging region specification unit 31 and a detected touch position calculation unit 32.

The belonging region specification unit 31 specifies a partitioned region including the touch region among the plurality of partitioned regions, into which the screen surface of the touch screen is partitioned, based on the touch region information received from the touch region information acquisition unit 11.

The detected touch position calculation unit 32 memorizes the correspondence that associates the plurality of partitioned regions with the factor values corresponding to the respective partitioned regions. In such correspondence, a first factor value associated with a first partitioned region is larger than a second factor value associated with a second partitioned region closer to the reference position of the screen surface than the first partitioned region.

The detected touch position calculation unit 32 then decides the value of the factor $\alpha$ based on the partitioned region specified in the belonging region specification unit 31 and the correspondence. Specifically, the detected touch position calculation unit 32 selects the value of the factor $\alpha$ associated with the specified partitioned region in the correspondence.

The detected touch position calculation unit 32 then calculates the detected touch position by substituting the value of the selected factor $\alpha$ into the above equation (3).

[Behavior of Input Device 30]

Figure 7:
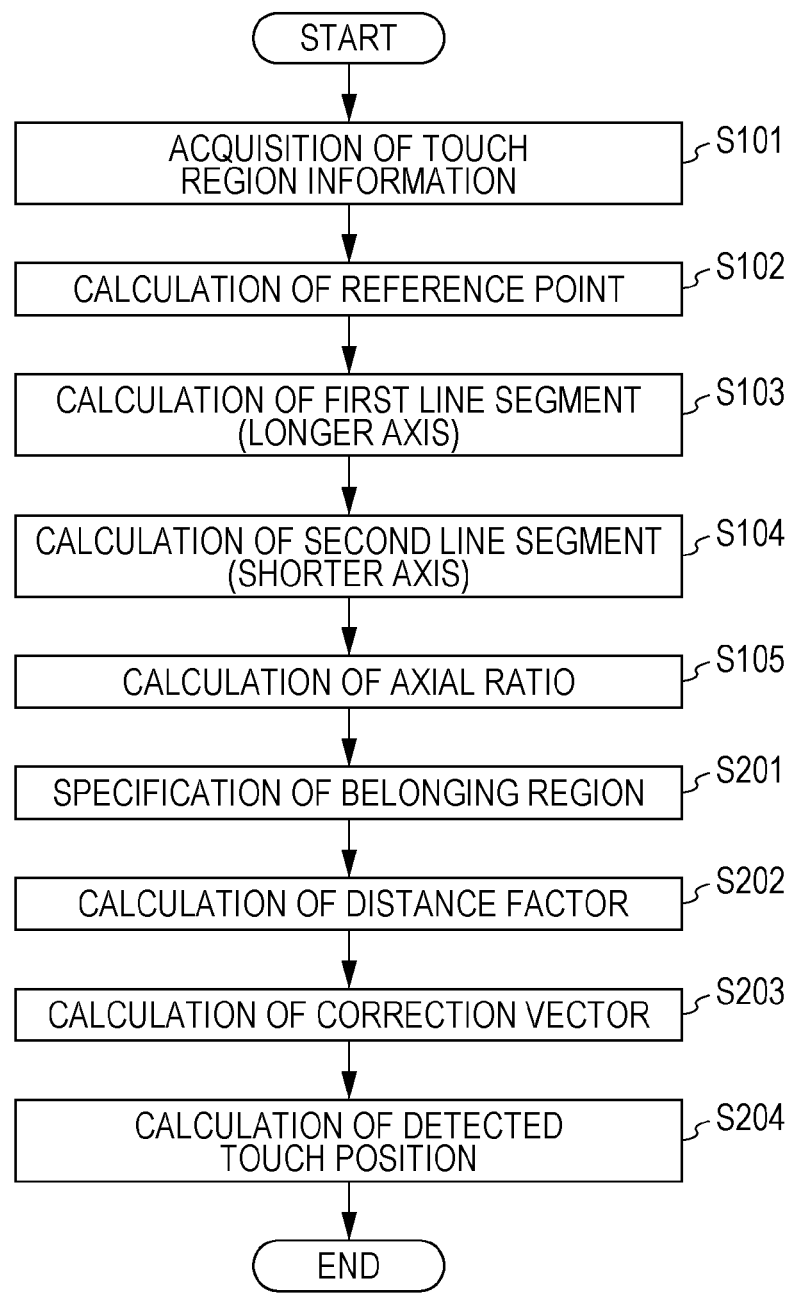
FIG. 7 is a method for a description of a behavior of the input device according to the second embodiment.
Figure 8:
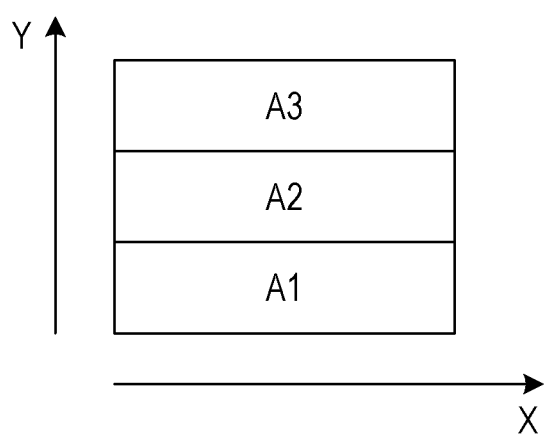
FIG. 8 is a chart for a description of partitioned regions.

A description is given to a behavior of the input device 30 having the above configuration. FIG. 7 is a method for a description of a behavior of the input device 30. FIG. 8 is a chart for a description of partitioned regions. FIG. 9 is a chart for a description of a correspondence table.

In step S201, the belonging region specification unit 31 specifies the partitioned region including the touch region among the plurality of partitioned regions, into which the screen surface of the touch screen is partitioned, based on the touch region information received from the touch region information acquisition unit 11. As illustrated in FIG. 8, the screen surface of the touch screen is partitioned into, for example, three partitioned regions A1 through A3. The partitioned region A1 is a partitioned region on a user side (that is, front most viewed from the user) when the user operates a mobile terminal having the touch screen mounted thereon. For example, in FIG. 8, a location with the smallest value of Y-coordinate in the partitioned region A1 is the reference position of the touch screen.

In step S202, the detected touch position calculation unit 32 calculates the value of the factor $\alpha$ based on the partitioned region specified in the belonging region specification unit 31 and the correspondence.

Specifically, the detected touch position calculation unit 32 memorizes a correspondence table as indicated, for example, in FIG. 9. In the correspondence table, factor values $\alpha1$ through $\alpha3$ are associated respectively with the partitioned regions A1 through A3. Then, it is preferred that the relationship of $\alpha1<\alpha2<\alpha3$ holds. Here, all of the $\alpha1$, $\alpha2$, and $\alpha3$ are positive values. Then, in a case that the partitioned region A3 is specified in the belonging region specification unit 31, the detected touch position calculation unit 32 selects the factor value $\alpha3$ associated with the partitioned region A3.

In step S203, the detected touch position calculation unit 32 calculates the correction vector based on the shape parameter and the factor $\alpha$. For example, the length of the correction vector is a product of the axial ratio and the factor $\alpha$.

In step S204, the detected touch position calculation unit 32 corrects the reference point using the correction vector.

Here, the value of the factor $\alpha$, which is associated with the partitioned region close to the reference position of the touch screen (for example, the partitioned region A1) may also be zero. In other words, in a case that the touch region is included in the partitioned region close to the reference position of the touch screen, the reference point of the touch region may also be the detected touch position.

As just described above, according to the present embodiment, in the input device 30, the belonging region specification unit 31 specifies the partitioned region, to which the touch region belongs, among the plurality of partitioned regions. The detected touch position calculation unit 32 then decides the factor $\alpha$ based on the specified partitioned region and the correspondence that associates the plurality of partitioned regions with the factor values corresponding to the respective partitioned regions. In this correspondence, the first factor value associated with the first partitioned region is larger than the second factor value associated with the second partitioned region closer to the reference position of the screen surface of the touch screen than the first partitioned region.

This enables to select the factor $\alpha$, corresponding to the distance from the reference position, of the partitioned region to which the touch region belongs. By using this factor $\alpha$, the length of the correction vector can be adjusted directly to a length corresponding to the distance from the reference position.

Third Embodiment

In a third embodiment, the hand touching the touch screen is determined whether the right hand or the left hand to switch the factor value associated with each partitioned region corresponding to the determination result.

Figure 10:
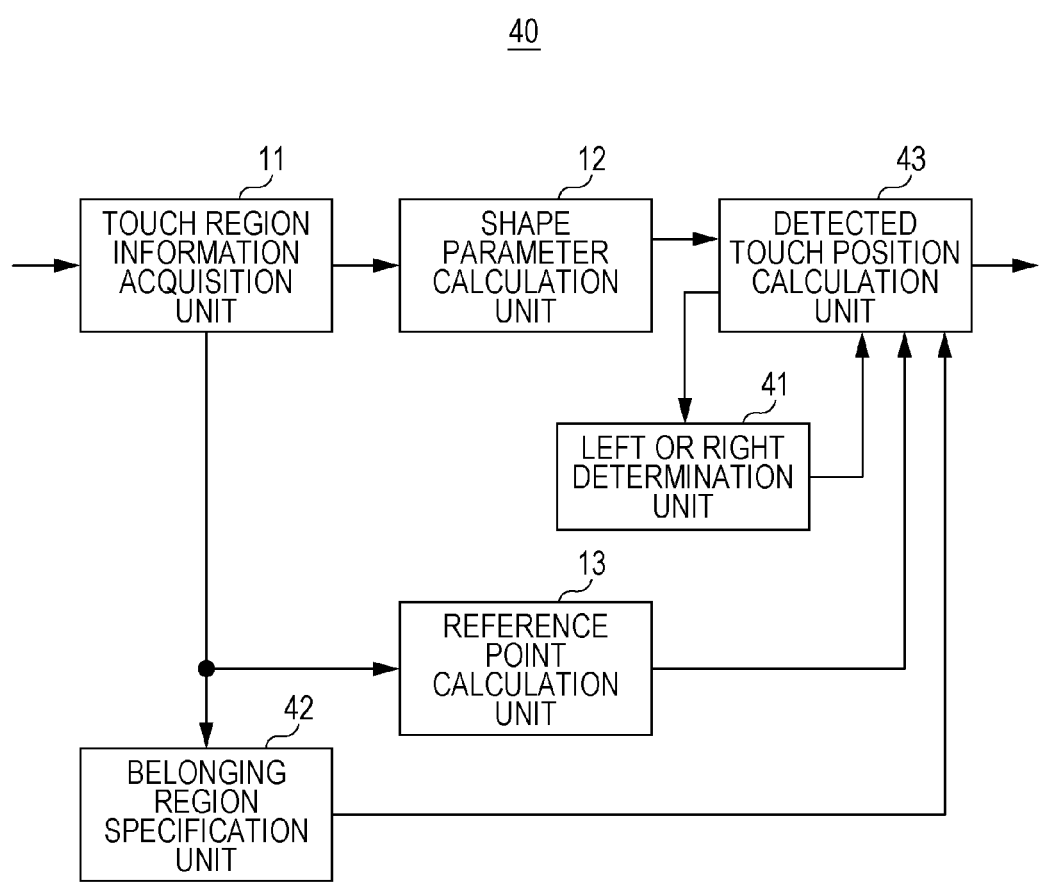
FIG. 10 is a block diagram illustrating a configuration example of an input device according to a third embodiment.

FIG. 10 is a block diagram illustrating a configuration example of an input device 40 according to the third embodiment. In FIG. 10, the input device 40 has a left or right determination unit 41, a belonging region specification unit 42, and a detected touch position calculation unit 43.

The left or right determination unit 41 determines whether the hand touching the touch screen is the right hand or the left hand based on the angle θ calculated in the detected touch position calculation unit 43.

The belonging region specification unit 42 specifies the partitioned region in which the touch region is included among the plurality of partitioned regions into which the screen surface of the touch screen is partitioned, based on the touch region information received from the touch region information acquisition unit 11.

The detected touch position calculation unit 43 memorizes the correspondence that associates the plurality of partitioned regions with the factor values corresponding to the respective partitioned regions. In this correspondence, correspondence for a left hand and correspondence for a right hand are included. In the correspondence for a left hand, a third factor value associated with a third partitioned region is larger than a fourth factor value associated with a fourth partitioned region that is at an equal distance from the third partitioned region and the reference position of the touch screen and also on the left of the screen surface from the third partitioned region. In contrast, in the correspondence for a right hand, the fourth factor value is larger than the third factor value.

In a case that the left or right determination unit 41 determines as the left hand, the detected touch position calculation unit 43 then decides the value of the factor $\alpha$ based on the correspondence for a left hand and the partitioned region specified in the belonging region specification unit 42. Specifically, the detected touch position calculation unit 43 selects the value of the factor α associated with the specified partitioned region in the correspondence for a left hand. In contrast, in a case that the left or right determination unit 41 determines as the right hand, the detected touch position calculation unit 43 decides the value of the factor α based on the correspondence for a right hand and the partitioned region specified in the belonging region specification unit 42.

The detected touch position calculation unit 43 then calculates the detected touch position by substituting the value of the selected factor α into the above equation (3).

[Behavior of Input Device 40]

Figure 11:
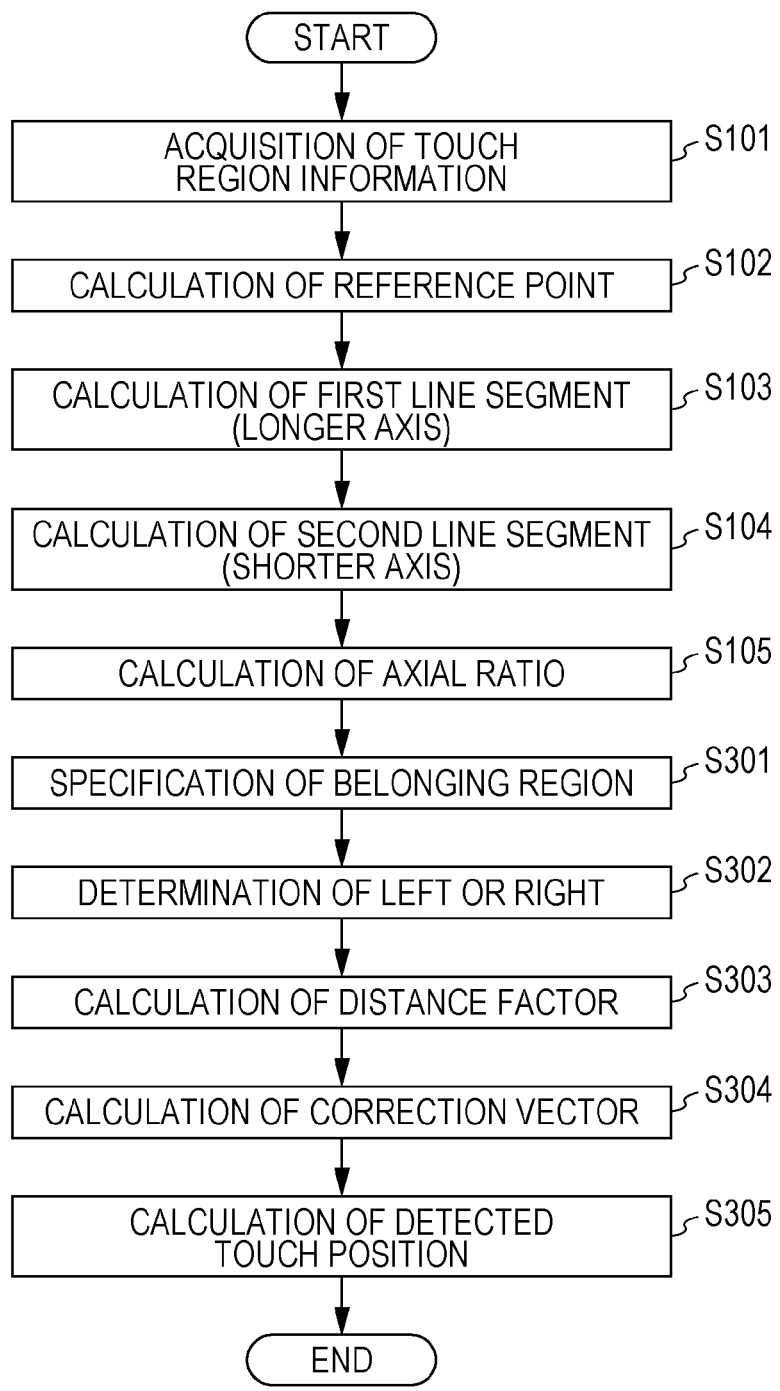
FIG. 11 is a method for a description of a behavior of the input device according to the third embodiment.
Figure 12:
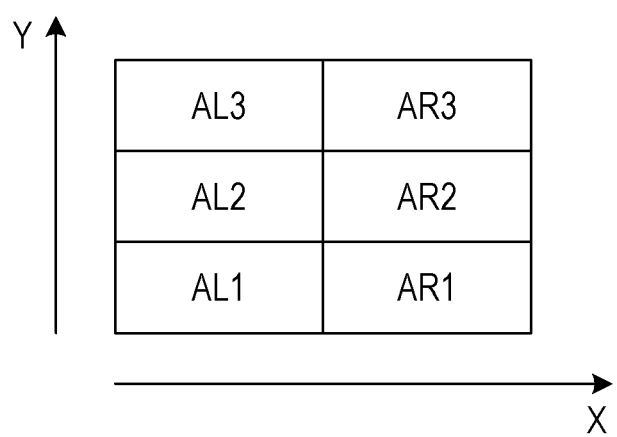
FIG. 12 is a chart for a description of partitioned regions.

A description is given to a behavior of the input device 40 having the above configuration. FIG. 11 is a method for a description of a behavior of the input device 40. FIG. 12 is a chart for a description of partitioned regions. FIG. 13 is a chart for a description of a correspondence table for a right hand. FIG. 14 is a chart for a description of a correspondence table for a left hand.

In step S301, the belonging region specification unit 42 specifies the partitioned region in which the touch region is included among the plurality of partitioned regions into which the screen surface of the touch screen is partitioned, based on the touch region information received from the touch region information acquisition unit 11. As illustrated in FIG. 12, the screen surface of the touch screen is partitioned into, for example, six partitioned regions in total of three partitioned regions AL1 through AL3 in the left columns and three partitioned regions AR1 through AR3 in the right columns.

In step S302, the left or right determination unit 41 determines whether the hand touching the touch screen is the right hand or the left hand based on the angle θ calculated in the detected touch position calculation unit 43. When operating a mobile terminal with a thumb of one hand, the thumb is directed in an upper right direction on the touch screen surface in a case of the left hand, and the thumb is directed in an upper left direction on the touch screen surface in a case of the right hand. With that, the left or right determination unit 41 determines that the operation is carried out with the left hand in a case of the angle θ being less than 90 degrees and determines that the operation is carried out with the right hand in a case of more than 90 degrees.

In step S303, the detected touch position calculation unit 43 calculates the value of the factor α based on the partitioned region specified in the belonging region specification unit 42 and the correspondence. In other words, in a case that the left or right determination unit 41 determines as the left hand, the detected touch position calculation unit 43 decides the value of the factor α based on the correspondence for a left hand and the partitioned region specified in the belonging region specification unit 42. In contrast, in a case that the left or right determination unit 41 determines as the right hand, the detected touch position calculation unit 43 decides the value of the factor α based on the correspondence for a right hand and the partitioned region specified in the belonging region specification unit 42.

Specifically, the detected touch position calculation unit 43 memorizes, for example, a correspondence table for a right hand as indicated in FIG. 13 and a correspondence table for a left hand as indicated in FIG. 14. In the correspondence table for a right hand, the partitioned regions AR1 through AR3 and AL1 through AL3 are associated respectively with α1 through α6. In contrast, in the correspondence table for a left hand, the partitioned regions AR1 through AR3 and AL1 through AL3 are associated respectively with α4 through α6 and α1 through α3. Then, it is preferred that the relationship of $α1<α2<α3$ and the relationship of $α4<α5<α6$ hold. All of α1, α2, α3, α4, α5, and α6 are positive values. In addition, it is preferred that the relationship of $α4>α1$, the relationship of $α5>α2$, and the relationship of $α6>α3$ hold. In other words, the reference position of the touch screen comes to the lower left of the touch screen in a case of operating with the left hand and to the lower right of the touch screen in a case of operating with the right hand. Regardless of operating with either hand, as the partitioned region is closer to the reference position of the touch screen, the value of the factor α associated with the partitioned region is smaller.

In step S304, the detected touch position calculation unit 43 calculates the correction vector based on the shape parameter and the factor α. For example, the length of the correction vector is a product of the axial ratio and the factor α.

In step S305, the detected touch position calculation unit 43 corrects the reference point using the correction vector.

Here, the value of the factor α, which is associated with the partitioned region close to the reference position of the touch screen (for example, the partitioned region AL1 in the correspondence table for a left hand and the partitioned region AR1 in the correspondence table for a right hand) may also be zero. In other words, in a case that the touch region is included in the partitioned region close to the reference position of the touch screen, the reference point of the touch region may also be the detected touch position.

As just described above, according to the present embodiment, in the input device 40, the left or right determination unit 41 determines whether the hand touching the touch screen is the right hand or the left hand based on the angle θ calculated in the detected touch position calculation unit 43. Then, in a case that the left or right determination unit 41 determines as the left hand, the detected touch position calculation unit 43 decides the value of the factor α based on the correspondence for a left hand and the partitioned region specified in the belonging region specification unit 42. In contrast, in a case that the left or right determination unit 41 determines as the right hand, the detected touch position calculation unit 43 decides the value of the factor α based on the correspondence for a right hand and the partitioned region specified in the belonging region specification unit 42. Then, in the correspondence for a left hand, the third factor value associated with the third partitioned region is larger than the fourth factor value associated with the fourth partitioned region being at an equal distance from the third partitioned region and the reference position of the screen surface and also on the left of the screen surface from the third partitioned region. In contrast, in the correspondence for a right hand, the fourth factor value is larger than the third factor value.

This enables to select the factor α matching the distance, which varies in accordance with whether the hand touching the touch screen is right or left, from the reference position of the partitioned region. By using this factor α, the length of the correction vector can be adjusted directly to a length corresponding to the distance from the reference position.

Fourth Embodiment

A fourth embodiment relates to a variation for a method of calculating the reference point of the touch region.

Figure 15:
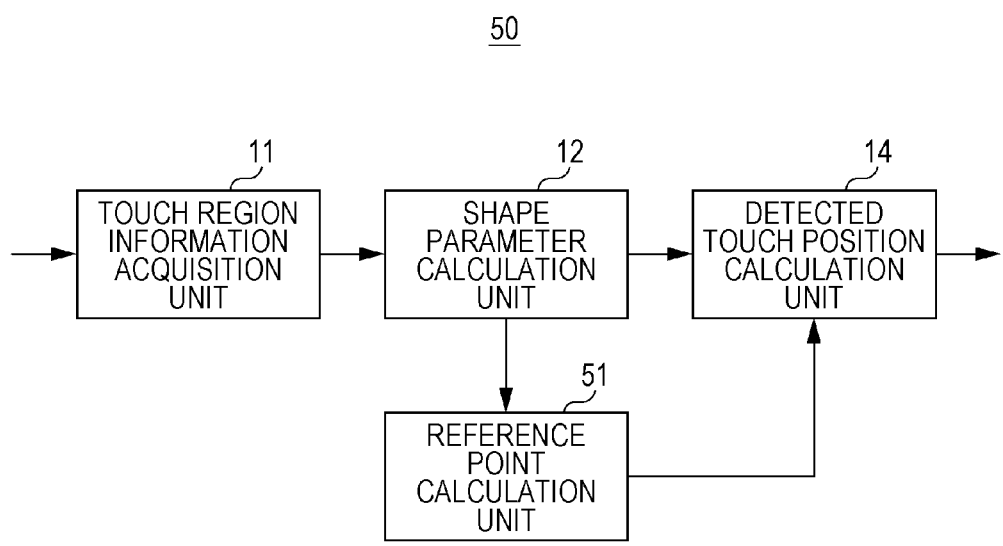
FIG. 15 is a block diagram illustrating a configuration example of an input device according to a fourth embodiment.

FIG. 15 is a block diagram illustrating a configuration of an input device 50 according to the fourth embodiment. In FIG. 15, the input device 50 has a reference point calculation unit 51. The reference point calculation unit 51 calculates a midpoint of the first line segment calculated in the shape parameter calculation unit 12 as the reference point.

Fifth Embodiment

A fifth embodiment relates to a variation for a method of calculating the shape parameter.

Figure 16:
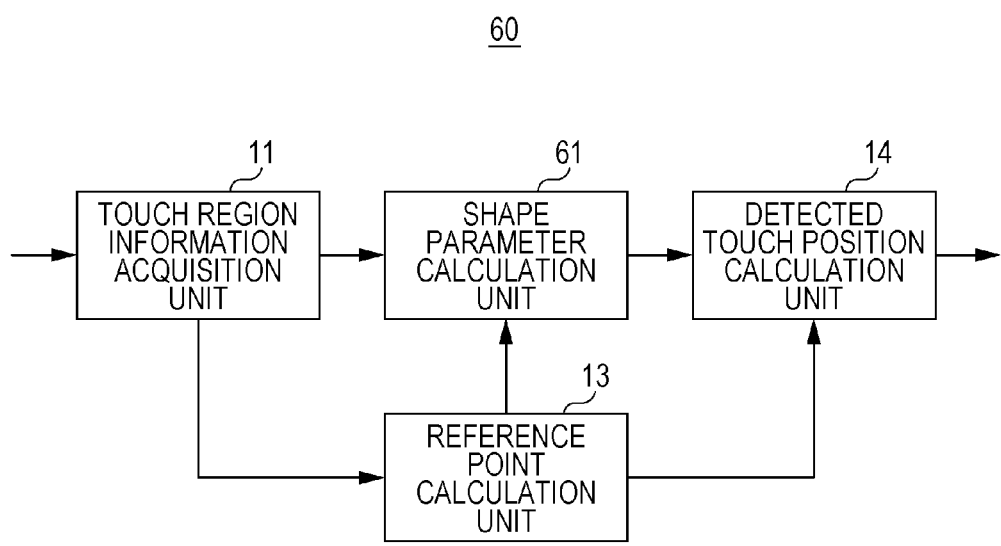
FIG. 16 is a block diagram illustrating a configuration example of an input device according to a fifth embodiment.

FIG. 16 is a block diagram illustrating a configuration of an input device 60 according to the fifth embodiment. In FIG. 16, the input device 60 has a shape parameter calculation unit 61.

The shape parameter calculation unit 61 calculates the shape parameter based on the touch region information received from the touch region information acquisition unit 11 and the reference point received from the reference point calculation unit 13.

Specifically, the shape parameter calculation unit 61 specifies a sensor pair with a longest length of a line segment among sensor pairs having the position coordinates to be end points of a line segment through the reference point within a sensor data group included in the touch region information and also having sensed values not less than a predefined value. The line segment having the end points of the position coordinates of the specified sensor pair is the first line segment.

The shape parameter calculation unit 61 next calculates a second line segment having "predefined relative positional relationship" with the first line segment.

The shape parameter calculation unit 61 next calculates a ratio d/d' of the length of the first line segment to the length of the second line segment as an axial ratio.

Sixth Embodiment

Figure 17:
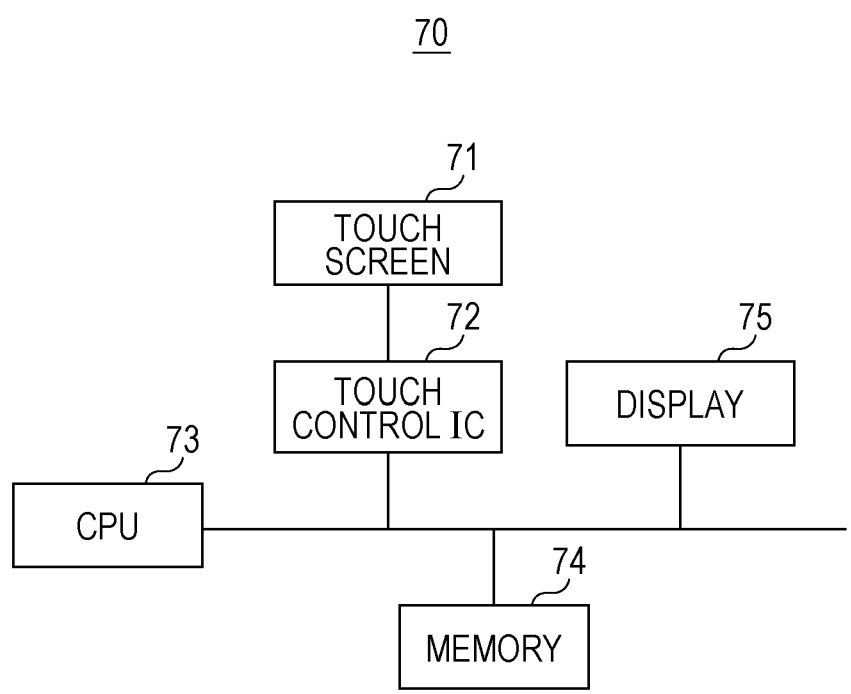
FIG. 17 is a diagram illustrating a circuit configuration example of a mobile terminal according to a sixth embodiment.

A sixth embodiment relates to a specific electronic circuit configuration including a mobile terminal including the input devices in the first through fifth embodiments. FIG. 17 is a diagram illustrating a circuit configuration example of a mobile terminal according to the sixth embodiment.

In FIG. 17, a mobile terminal 70 has a touch screen 71, a touch control IC (integrated circuit) 72, a CPU (central processing unit) 73, a memory 74, and a display 75.

The touch control IC 72 corresponds to the touch region information acquisition unit, the shape parameter calculation unit, and the reference point calculation unit. The CPU 73 corresponds to the detected touch position calculation unit, the left or right determination unit, and the belonging region specification unit. In the memory 74, programs and the like are memorized to execute process in the touch region information acquisition unit, the shape parameter calculation unit, the reference point calculation unit, the detected touch position calculation unit, the left or right determination unit, and the belonging region specification unit described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An input device comprising:
    a memory; and
    a processor coupled to the memory, configured to:
        acquire touch region information including position coordinates of a plurality of sensors in a touch screen and a sensed value of each sensor,
        calculate a first line segment and a second line segment, the first line segment including end points of position coordinates of two sensors having a largest separation distance among the plurality of sensors included in a touch region based on the region information, the second line segment crossing the first line segment and including end points of two intersection points with an outline of the touch region, and
        calculate coordinates of detected touch position by adding a vector to coordinates of a reference point of the touch region, the vector having a length obtained by multiplying a ratio of a length of the first line segment to a length of the second line segment by a predefined factor, and the vector having a direction corresponding to an angle made by the first line segment and a references vector on a screen surface of the touch screen.

2. The input device according to claim 1, wherein
the screen surface is partitioned into a plurality of partitioned regions;
the input device further includes a specification unit to specify a partitioned region to which the touch region belongs among the plurality of partitioned regions; and
and wherein the processor is further configured to:
associate the plurality of partitioned regions with factor values corresponding to the respective partitioned regions correspondence in which a first factor value associated with a first partitioned region is larger than a second factor value associated with a second partitioned region closer to a reference position of the screen surface than the first partitioned region, and
decide the predefined factor based on the specified partitioned region and the correspondence.

3. The input device according to claim 2, wherein
a factor value associated with a partitioned region closest to the reference position among the plurality of partitioned regions is zero.

4. The input device according to claim 2, wherein the processor is further configured to:
    determine whether a hand touching the touch screen is a right hand or a left hand based on the angle; wherein the correspondence includes correspondence for a left hand, in which a third factor value associated with a third partitioned region is larger than a fourth factor value associated with a fourth partitioned region being at an equal distance from the third partitioned region and the reference position and also being in a left side on the screen surface from the third partitioned region, and correspondence for a right hand, in which the fourth factor value is larger than the third factor value, and
    decide the predefined factor based on the correspondence for a right hand and the specified partitioned region in a case that the processor determines as the right hand.

5. A method for touch position calculation executed by an input device including a memory and a processor coupled to the memory, the method comprising:
    acquiring touch region information including position coordinates of a plurality of sensors in a touch screen and a sensed value of each sensor;
    calculating a first line segment and a second line segment, the first line segment including end points of position coordinates of two sensors having a largest separation distance among the plurality of sensors included in a touch region based on the touch region information, the second line segment crossing the first line segment and including end points of two intersection points with an outline of the touch region; and calculating coordinates of a detected touch position by adding a vector to coordinates of a reference point of the touch region, the vector having a length obtained by multiplying a ratio of a length of the first line segment to a length of the second line segment by a predefined factor, and the vector having a direction corresponding to an angle made by the first line segment and a reference vector on a screen surface of the touch screen.

6. The input device according to claim 1, wherein the calculated touch position is calculated according to the following equation $$(X', Y') = (Xg + d/d' \times \cos\theta, Yg + d/d' \times \sin\theta),$$

where X' is the calculated touch position in an X direction and Y' is the calculated touch position in a Y direction on a X-Y coordinate system, Xg is an X position acquired coordinate value, Yg is an Y position acquired coordinate value, d is the length of the first line segment, d' is the length of the second line segment, α is the predefined factor, and θ is an angle made by the first line segment and a reference vector on a screen surface of the touch screen.

* * * * *